US012091289B2

(12) United States Patent
Kou et al.

(10) Patent No.: US 12,091,289 B2
(45) Date of Patent: Sep. 17, 2024

(54) LIFTING MECHANISM FOR OVERHEAD MONORAIL AND OVERHEAD MONORAIL

(71) Applicant: TAIYUAN UNIVERSITY OF TECHNOLOGY, Shanxi (CN)

(72) Inventors: Ziming Kou, Shanxi (CN); Yongcun Guo, Shanxi (CN); Haiqing Wang, Shanxi (CN); Fuli Sun, Shanxi (CN); Pengfei Yin, Shanxi (CN)

(73) Assignee: TAIYUAN UNIVERSITY OF TECHNOLOGY, Shanxi (CN)

( * ) Notice: Subject to any disclaimer, the term of this patent is extended or adjusted under 35 U.S.C. 154(b) by 929 days.

(21) Appl. No.: 17/257,586

(22) PCT Filed: Nov. 22, 2018

(86) PCT No.: PCT/CN2018/117027
§ 371 (c)(1),
(2) Date: Jan. 4, 2021

(87) PCT Pub. No.: WO2020/006970
PCT Pub. Date: Jan. 9, 2020

(65) Prior Publication Data
US 2021/0122614 A1 Apr. 29, 2021

(30) Foreign Application Priority Data
Jul. 5, 2018 (CN) ......................... 201810727954.0

(51) Int. Cl.
*B66C 11/16* (2006.01)
*B66C 6/00* (2006.01)
(Continued)

(52) U.S. Cl.
CPC ................ *B66C 11/16* (2013.01); *B66C 6/00* (2013.01); *B66C 11/04* (2013.01); *B66C 11/06* (2013.01);
(Continued)

(58) Field of Classification Search
CPC .. B66C 11/06; B66C 6/00; B66C 9/14; B66C 11/04; B66C 11/16; B66C 15/00;
(Continued)

(56) References Cited

U.S. PATENT DOCUMENTS 2,988,927 A * 6/1961 Thoma .................. F16H 61/664 74/388 R
5,074,423 A * 12/1991 Smith ....................... B66C 9/14 254/311
8,357,064 B1 * 1/2013 Fery .......................... F16H 7/06 474/156

FOREIGN PATENT DOCUMENTS

CN 102556847 7/2012
CN 203513116 U * 4/2014
(Continued)

OTHER PUBLICATIONS

"International Search Report (Form PCT/ISA/210) of PCT/CN2018/117027," mailed on Feb. 12, 2019, with English translation thereof, pp. 1-4.

*Primary Examiner* — S. Joseph Morano
*Assistant Examiner* — Cheng X Lin
(74) *Attorney, Agent, or Firm* — JCIP GLOBAL INC.

(57) ABSTRACT

A lifting mechanism includes a lifting beam, a hanging portion suspended below the lifting beam and including a hanging base, a hanging chain, a movable sprocket disposed on the hanging base, a distance adjusting sprocket, and a power mechanism. The distance adjusting sprocket and the power mechanism are arranged side by side and separately on the lifting beam. The power mechanism includes a fixed sprocket and a driving portion. The fixed sprocket is driven by the driving portion to drive the hanging chain to move, so as to lift or lower the hanging portion. An end of the hanging chain is fixed to the lifting beam, and the other end of the hanging chain engages the movable sprocket, the fixed
(Continued)

sprocket, and the distance adjusting sprocket, or the other end of the hanging chain engages the movable sprocket, the distance adjusting sprocket, and the fixed sprocket.

12 Claims, 5 Drawing Sheets

(51) Int. Cl.

| | |
|---|---|
| ***B66C 11/04*** | (2006.01) |
| ***B66C 11/06*** | (2006.01) |
| ***B66D 3/18*** | (2006.01) |
| *B66C 9/14* | (2006.01) |
| *B66C 15/00* | (2006.01) |
| *B66C 17/04* | (2006.01) |
| *B66D 3/26* | (2006.01) |

(52) U.S. Cl.
CPC .................. *B66D 3/18* (2013.01); *B66C 9/14* (2013.01); *B66C 15/00* (2013.01); *B66C 17/04* (2013.01); *B66D 3/26* (2013.01)

(58) Field of Classification Search
CPC ........... B66C 17/00; B66C 17/04; B66D 3/16; B66D 3/26
See application file for complete search history.

(56) References Cited

FOREIGN PATENT DOCUMENTS

| | | | | | |
|---|---|---|---|---|---|
| CN | 204917617 | | | 12/2015 | |
| CN | 205061400 | | | 3/2016 | |
| CN | 105480860 | A | * | 4/2016 | |
| CN | 105502195 | A | * | 4/2016 | |
| CN | 108821113 | | | 11/2018 | |
| DE | 2800129 | | | 7/1979 | |
| DE | 2927981 | | | 1/1981 | |
| DE | 4101261 | | | 7/1992 | |
| DE | 4101261 | A1 | * | 7/1992 | |
| DE | 10204372 | A1 | * | 8/2003 | ............. B66C 11/06 |
| GB | 2048199 | A | * | 12/1980 | ............. B66C 17/04 |

* cited by examiner

LIFTING MECHANISM FOR OVERHEAD MONORAIL AND OVERHEAD MONORAIL

CROSS-REFERENCE TO RELATED APPLICATION

This application is a 371 of international application of PCT application serial no. PCT/CN2018/117027, filed on Nov. 22, 2018, which claims the priority benefit of China Application no. 201810727954.0, filed on Jul. 5, 2018. The entirety of each of the above mentioned patent applications is incorporated herein by reference and made a part of this specification.

BACKGROUND

Technical Field

The present invention relates to the field of trolley locomotives, and specifically to a lifting mechanism for an overhead monorail and an overhead monorail.

Description of Related Art

Overhead monorails are often used to transport goods and people in special occasions such as coal mine roadways, road tunnels, and railway tunnels. The main advantages of overhead monorail transportation include: first, the overhead monorail has a small cross-section and high utilization of the space of the roadway cross-section; second, it can be used for continuous non-reload transportation in flat and inclined roadways, the transport load is not limited by the ground conditions, and it can run on complex roadways such as flats, ramps and turns; and third it can complete auxiliary transportation from the district station to the working face without reloading, and can be used for auxiliary transportation operations that connect the main transportation roadway with the mining area roadway.

A lifting beam is disposed under the overhead monorail. The lifting beam is connected with two or more hanging apparatuses configured to lift an object to be lifted on the roadway floor to the overhead monorail for transportation. However, in order to lift heavy objects to be lifted, existing lifting beams need to adopt a multi-layer structure including a main beam and a secondary beam, which affects the lifting height of the object to be lifted, and leads to a complicated structure.

For example, Chinese Utility Model Patent Publication No. CN204917617U entitled "Heavy-duty hydraulic lifting beam for overhead monorail" achieves a lifting weight of up to 48 tons, exhibiting a strong lifting capacity. This apparatus uses a power-driven trolley to realize the transportation and traveling of the lifting beam on the track. The trolley of this apparatus is connected with a trolley connecting beam, a main transverse beam, and a load-bearing beam in sequence, and the load-bearing beam is used for lifting heavy objects. However, because this apparatus includes a large number of beams connected in the direction perpendicular to the height direction, the space for carrying heavy objects is reduced in the height direction.

In another example, in Chinese Utility Model Patent Publication No. CN205061400U entitled "Medium-size lifting beam for overhead monorail", a carrying trolley is connected to a carrying frame, and a fixed sprocket, a hydraulic cylinder, a movable sprocket, and the like are disposed in the carrying frame. The movable sprocket is driven by the hydraulic cylinder to lift heavy objects. Such a lifting beam has a small lifting capacity and cannot meet the requirements for the development of heavy-duty equipment. The design inside the beam is complicated, and the lifting height is not high.

SUMMARY

In view of this, an objective of embodiments of the present invention is to provide a lifting mechanism for an overhead monorail and an overhead monorail, which achieve a high lifting height for an object to be lifted, and feature a simple structure.

To achieve the above objective, the technical solutions of the embodiments of the present invention are implemented as follows.

A lifting mechanism for an overhead monorail includes a lifting beam, a hanging portion, a hanging chain, a movable sprocket, a distance adjusting sprocket and a power mechanism. The hanging portion is suspended below the lifting beam by the hanging chain, the hanging portion includes a hanging base and a hanging member connected below the hanging base, and the movable sprocket is disposed on the hanging base. The distance adjusting sprocket and the power mechanism are arranged side by side and separately on the lifting beam, the power mechanism includes a fixed sprocket and a driving portion configured to drive the fixed sprocket to rotate, and the fixed sprocket is driven by the driving portion to drive the hanging chain to move, so as to lift or lower the hanging portion. An end of the hanging chain is fixed to the lifting beam, and the other end of the hanging chain engages the movable sprocket, the fixed sprocket, and the distance adjusting sprocket in sequence, or the other end of the hanging chain engages the movable sprocket, the distance adjusting sprocket, and the fixed sprocket in sequence.

In the above solution, two hanging chains may be provided, one hanging base may be provided, and two movable sprockets, two fixed sprockets and two distance adjusting sprockets may be provided. The power mechanism is located in a middle portion of the lifting beam, the two fixed sprockets are disposed side by side, the hanging portion is located below the middle portion of the lifting beam, the two distance adjusting sprockets are symmetrically distributed on both sides of the power mechanism, and the two movable sprockets are disposed side by side on the one hanging base. An end of each of the two hanging chains is fixed to the middle portion of the lifting beam, and the other end of each of the two hanging chains engages the respective movable sprocket, fixed sprocket, and distance adjusting sprocket in sequence. Because the two movable sprockets are disposed side by side on the one hanging base, the hanging base can carry a heavier object to be lifted, for example, a hydraulic support.

In the above solution, the lifting mechanism may further include two hanging chain bags, and each of the two hanging chain bags corresponds to a respective one of the positions of the two distance adjusting sprockets, and is suspended below the lifting beam. The other end of each of the two hanging chains, after engaging the respective distance adjusting sprocket, is accommodated in the respective hanging chain bag. The hanging chain bag is configured to accommodate excess chain after lifting, thereby improving the safety.

In the above solution, two hanging chains may be provided, and two hanging portions, two movable sprockets, two fixed sprockets and two distance adjusting sprockets may be provided, and each of the hanging portions may include one hanging base. The power mechanism is located in a middle portion of the lifting beam, the two fixed sprockets are disposed side by side, the two distance adjusting sprockets are symmetrically distributed on both sides of the power mechanism, each of the two movable sprockets is disposed on the respective hanging base, and each of the two hanging portions corresponds to a respective one of the positions of the two distance adjusting sprockets and is suspended below the lifting beam. An end of each of the two hanging chains is fixed to a respective one of two ends of the lifting beam, and the other end of each of the two hanging chains engages the respective movable sprocket, distance adjusting sprocket, and fixed sprocket in sequence. Each of the two hanging portions may correspond to a respective one of two ends of the object to be lifted, for example, two ends of a cargo container.

In the above solution, the lifting beam may include an adjusting portion provided with a plurality of slots, the two distance adjusting sprockets each are disposed on the slots of the adjusting portion, and a distance between the two hanging portions is adjusted by adjusting the two distance adjusting sprockets to be located on different slots on the adjusting portion. In this way, the distance between the two hanging portions can be adjusted based on different objects to be lifted.

In the above solution, the adjusting portion may include two vertical plates spaced apart from each other, and upper ends of the two vertical plates are provided with at least three pairs of the slots in pairs. Two ends of each of the distance adjusting sprockets are disposed on one pair of slots on the two vertical plates, and the hanging chain engages the distance adjusting sprocket and is located between the two vertical plates. The two vertical plates spaced apart from each other make the structure of the adjusting portion simple.

In the above solution, the lifting mechanism may further include a hanging chain bag, and the hanging chain bag is suspended below the middle portion of the lifting beam. The other end of each of the two hanging chains, after engaging the respective fixed sprocket, is accommodated in the hanging chain bag. As described above, the hanging chain bag is configured to accommodate excess chain after lifting, thereby improving the safety.

In the above solution, two hanging chain bags may be provided, the two hanging chain bags are disposed side by side, and the other end of each of the two hanging chains, after engaging the respective fixed sprocket, is accommodated in the respective hanging chain bag. Or, one hanging chain bag may be provided, the one hanging chain bag is divided into two accommodating spaces, and the other end of each of the two hanging chains, after engaging the respective fixed sprocket, is accommodated in the respective accommodating space. In this way, the two hanging chains 33 can be prevented from being entangled with each other, thereby improving the safety.

In the above solution, the lifting mechanism may further include a ratchet mechanism disposed on the lifting beam. When the driving portion drives the fixed sprocket to rotate, the ratchet mechanism rotates to move the hanging chain. When the driving portion stops driving the fixed sprocket, the ratchet mechanism is stopped to prevent the hanging chain from rotating reversely. Here, the characteristic that the ratchet mechanism is rotatable only in one direction and not rotatable in the reverse direction is utilized to prevent uncontrolled reverse rotation of the hanging chain. After the lifting operation is completed, if a new lifting operation is to be started, the ratchet mechanism may be moved or rotated, so that the hanging chain moves to detach from the ratchet mechanism and lay down the hanging portion. In this case, the hanging chain can rotate reversely.

In the above solution, the ratchet mechanism is disposed on the fixed sprocket or the distance adjusting sprocket. Specifically, a ratchet in the ratchet mechanism may be coaxial with the fixed sprocket or the distance adjusting sprocket. In this way, the structure is relatively simple and does not require any additional component for engaging the ratchet mechanism with the hanging chain.

In the above solution, the hanging member may be one or more of a hook, a hanger rod or a hanging rope. In this way, the hanging member may be selected depending on different objects to be lifted.

In the above solution, the driving portion may be a hydraulic motor or an electric motor, which may be selected according to the weight of the object to be lifted and other working conditions.

In the above solution, the power mechanism may be a double-chain hydraulic lifting hoist. In this way, the lifting mechanism only needs to use one double-chain hydraulic lifting hoist to cooperate with the configuration of the two movable sprockets in the hanging base, making the configuration of the lifting mechanism compact. Furthermore, the double-chain hydraulic hoist is a common component in the art, so the production costs of the lifting mechanism can be reduced and the production efficiency can be improved.

In the above solution, the fixed sprocket, the movable sprocket and the distance adjusting sprocket may all be eight-tooth ring sprockets, which have a small number of teeth, provide stronger carrying capacity, achieve stable transmission, and enhance the universality and interchangeability of components.

The embodiments of the present invention further provide an overhead monorail, which may include at least two suspension apparatuses and any lifting mechanism described above, wherein each of the suspension apparatuses may include a cabinet and at least one mounting portion provided on the cabinet, and each of two ends of the lifting beam is mounted on a respective one of the mounting portions of the two suspension apparatuses. Here, the suspension apparatus is a power apparatus that is disposed on a guide rail of the overhead monorail and can move on the guide rail.

In the above solution, the cabinet may be provided with at least one pair of rotary shaft holes which are coaxial, the mounting portion includes a bearing plate and rotary shafts coaxially disposed at both ends of the bearing plate, a middle portion of the bearing plate is provided with a pin hole perpendicular to the rotary shafts, and each of the two rotary shafts is rotatably disposed in the respective rotary shaft hole. The lifting beam may include a beam body and fixing pins disposed at both ends of the beam body, and each of the fixing pins is rotatably inserted into the respective pin hole. In this way, the lifting beam has two degrees of freedom of rotation. Specifically, both ends of the lifting beam can rotate in the horizontal direction with respect to the suspension apparatus, i.e., the relative rotation of the fixing pin in the pin hole. The lifting beam as a whole can rotate in the vertical direction with respect to the suspension apparatus, i.e., the relative rotation of the rotary shaft in the rotary shaft hole. In this way, the overhead monorail can run stably on horizontal turns or slopes on the track.

The lifting mechanism for an overhead monorail and the overhead monorail that are provided in the embodiments of the present invention include a lifting beam, a hanging portion, a hanging chain, a movable sprocket, a distance adjusting sprocket and a power mechanism. The hanging portion is suspended below the lifting beam by the hanging chain, the hanging portion includes a hanging base and a hanging member connected below the hanging base, and the movable sprocket is disposed on the hanging base. The distance adjusting sprocket and the power mechanism are arranged side by side and separately on the lifting beam, the power mechanism includes a fixed sprocket and a driving portion configured to drive the fixed sprocket to rotate, and the fixed sprocket is driven by the driving portion to drive the hanging chain to move so as to lift or lower the hanging portion. An end of the hanging chain is fixed to the lifting beam, and the other end of the hanging chain engages the movable sprocket, the fixed sprocket, and the distance adjusting sprocket in sequence, or the other end of the hanging chain engages the movable sprocket, the distance adjusting sprocket, and the fixed sprocket in sequence. It can be seen that according to the lifting mechanism for an overhead monorail and the overhead monorail in the embodiments of the present invention, the hanging portion which is suspended by the hanging chain and can move up and down is directly disposed below the lifting beam to lift heavy objects, i.e., the lifting capacity is increased by using the principle of movable pulley, without needing to use a multi-layer structure. The present invention achieves a high lifting height for the object to be lifted, and features a simple structure.

Other beneficial effects of the present invention will be further described in specific implementations in conjunction with specific technical solutions.

DESCRIPTION OF THE EMBODIMENTS

Figure 1:
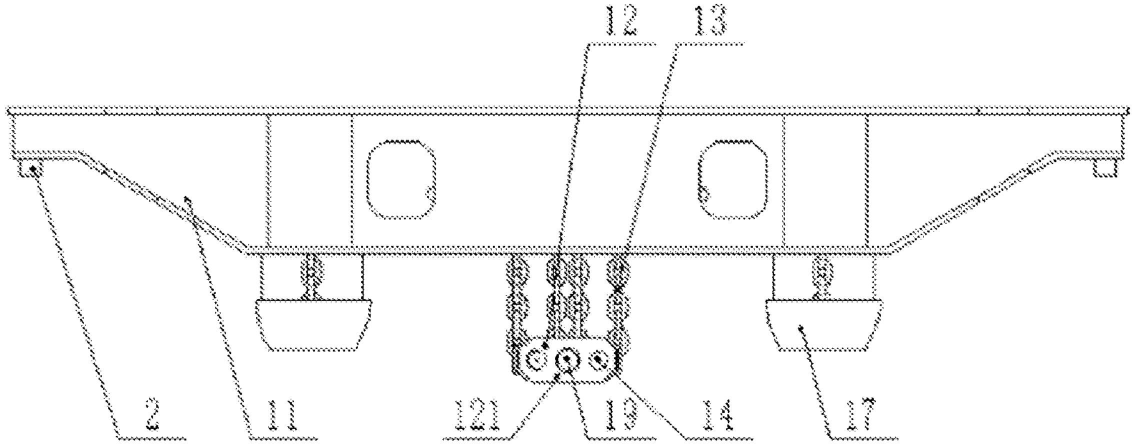
FIG. 1 shows a schematic diagram of a lifting mechanism for lifting a heavy object of an overhead monorail according to Embodiment 1 of the present invention.

The embodiments of the present invention provide a lifting mechanism for an overhead monorail, which may include a lifting beam, a hanging portion, a hanging chain, a movable sprocket, a distance adjusting sprocket and a power mechanism. The hanging portion is suspended below the lifting beam by the hanging chain. The hanging portion includes a hanging base and a hanging member connected below the hanging base. The movable sprocket is disposed on the hanging base. The distance adjusting sprocket and the power mechanism are arranged side by side and separately on the lifting beam. The power mechanism may include a fixed sprocket and a driving portion configured to drive the fixed sprocket to rotate. The fixed sprocket is driven by the driving portion to drive the hanging chain to move so as to lift or lower the hanging portion. An end of the hanging chain is fixed to the lifting beam, and the other end of the hanging chain engages the movable sprocket, the fixed sprocket, and the distance adjusting sprocket in sequence, or the other end of the hanging chain engages the movable sprocket, the distance adjusting sprocket, and the fixed sprocket in sequence.

The principle of the embodiments of the present invention is as follows. The hanging portion which is suspended by the hanging chain and can move up and down is directly disposed below the lifting beam to lift heavy objects, i.e., the lifting capacity is increased by using the principle of movable pulley, without needing to use a multi-layer structure. The present invention achieves a high lifting height for the object to be lifted, and features a simple structure.

The present invention will be further described below with reference to the accompanying drawings and specific embodiments. It should be understood that the specific embodiments described herein are merely used for explaining the present invention, and are not intended to limit the present invention.

It should be noted that in the description of the embodiments of the present invention, unless otherwise specified and defined, the term "connect" or any variant thereof should be understood in a broad sense. For example, it may be an electrical connection, or a communication between two components, and may be a direct connection, or an indirect connection via an intermediate medium. For those of ordinary skill in the art, the specific meaning of the above terms can be understood according to specific circumstances.

It should be noted that the terms such as "first/second/third" as used in the embodiments of the present invention are only for distinguishing similar objects and do not represent a specific order for the objects. It should be understood that "first/second/third" can be interchanged in a specific order or sequence when permitted. It should be understood that the objects distinguished by "first\second\third" can be interchanged under appropriate circumstances, so that the embodiments of the present invention described herein can be implemented in an order other than those illustrated or described herein.

Embodiment 1

Figure 2:
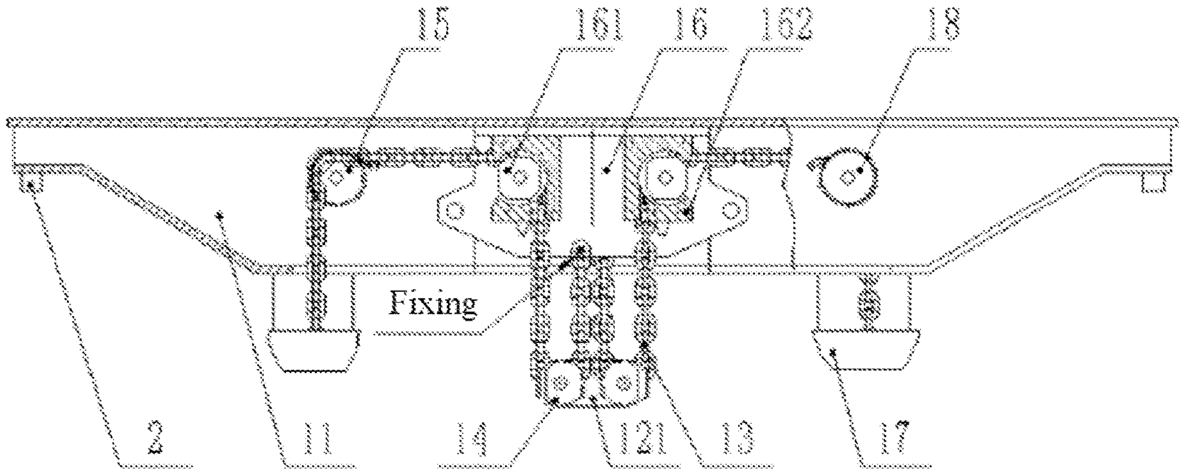
FIG. 2 shows a schematic cross-sectional view of FIG. 1.

FIG. 1 is a schematic diagram of a lifting mechanism for heavy objects of an overhead monorail according to Embodiment 1 of the present invention. FIG. 2 is a schematic cross-sectional view of FIG. 1. The lifting mechanism in this embodiment is fixed below two suspension apparatuses, and to lift of a heavy object, generally two or more lifting mechanisms are used. As shown in FIGS. 1 and 2, the lifting mechanism includes a lifting beam 11, a hanging portion 12, a hanging chain 13, a movable sprocket 14, a distance adjusting sprocket 15 and a power mechanism 16. The hanging portion 12 is suspended below the lifting beam 11 by the hanging chain 13. The hanging portion 12 includes a hanging base 121 and a hanging member connected below the hanging base 121. The movable sprocket 14 is disposed on the hanging base 121. The distance adjusting sprocket 15 and the power mechanism 16 are arranged side by side and separately on the lifting beam 11. The power mechanism 16 may include a fixed sprocket 161 and a driving portion 162 configured to drive the fixed sprocket 161 to rotate. The fixed sprocket 161 is driven by the driving portion 162 to drive the hanging chain 13 to move so as to lift or lower the hanging portion 12. An end of the hanging chain 13 is fixed to the lifting beam 11, and the other end of the hanging chain 13 engages the movable sprocket 14, the fixed sprocket 161, and the distance adjusting sprocket 15 in sequence.

Specifically, in this embodiment, two hanging chains 13 are provided, one hanging base 121 is provided, and two movable sprockets 14, two fixed sprockets 161 and two distance adjusting sprockets 15 are provided. The power mechanism 16 is located in a middle portion of the lifting beam 11. The two fixed sprockets 161 are disposed side by side. The hanging portion 12 is located below the middle portion of the lifting beam 11. The two distance adjusting sprockets 15 are symmetrically distributed on both sides of the power mechanism 16. The two movable sprockets 14 are disposed side by side on the one hanging base 121. An end of each of the two hanging chains 13 is fixed to the middle portion of the lifting beam 11, and the other end of each of the two hanging chains 13 engages the respective movable sprocket 14, fixed sprocket 161, and distance adjusting sprocket 15 in sequence. Because the two movable sprockets 14 in this embodiment are disposed side by side on the one hanging base 121, the hanging base 121 can carry a heavy object with a heavier weight, for example, a hydraulic support. However, because the entire lifting mechanism includes only one hanging base 121, generally two or more lifting mechanisms need to be used in combination during lifting, so that the object to be lifted can be lifted from two ends thereof at the same time, making the lifting more steady. It can be understood that three or more movable sprockets 14 may also be disposed on the hanging base 121 so as to carry a heavy object with a greater load.

In this embodiment, the lifting mechanism may further include two hanging chain bags 17. Each of the two hanging chain bags 17 corresponds to a respective one of the positions of the two distance adjusting sprockets 15, and is suspended below the lifting beam 11. The other end of each of the two hanging chains 13, after engaging the respective distance adjusting sprocket 15, is accommodated in the respective hanging chain bag 17. The hanging chain bag 17 is configured to accommodate excess chain after lifting, thereby improving the safety. It can be understood that the hanging chain bag 17 may be other form of apparatus configured to accommodate or receive the hanging chain, for example, may be a winch drum configured to wind the excess hanging chain 13.

In this embodiment, the lifting mechanism may further include a ratchet mechanism 18 disposed on the lifting beam 11. When the driving portion 162 drives the fixed sprocket 161 to rotate, the ratchet mechanism 18 rotates to move the hanging chain 13. When the driving portion 162 stops driving the fixed sprocket 161, the ratchet mechanism 18 is stopped to prevent the hanging chain 13 from rotating reversely. Here, the characteristic that the ratchet mechanism 18 is rotatable only in one direction and not rotatable in the reverse direction is utilized to prevent uncontrolled reverse rotation of the hanging chain 13. After the lifting operation is completed, if a new lifting operation is to be started, the ratchet mechanism 18 may be moved or rotated, so that the hanging chain 13 moves to detach from the ratchet mechanism 18 and lay down the hanging portion 12. In this case, the hanging chain 13 can rotate reversely. It can be understood that the mechanism that prevents the hanging chain 13 from rotating reversely may be a mechanism other than the ratchet mechanism 18, for example, may be a brake mechanism, etc.

In this embodiment, the ratchet mechanism 18 is disposed on the fixed sprocket 161 or the distance adjusting sprocket 15. Specifically, a ratchet in the ratchet mechanism 18 may be coaxial with the fixed sprocket 161 or the distance adjusting sprocket 15. In this way, the structure is relatively simple and does not require any additional component for engaging the ratchet mechanism 18 with the hanging chain 13. It can be understood that the ratchet mechanism 18 may be installed in other ways as long as the hanging chain 13 can be prevented from uncontrolled reverse rotation.

In this embodiment, the hanging member specifically may be a hanger rod 19. It can be understood that the hanging member may also be in other forms, for example, may be one or more of a hook, a hanger rod or a hanging rope, to facilitate the lifting of different objects to be lifted.

In this embodiment, the driving portion 162 specifically may be a hydraulic motor. The hydraulic motor can obtain a high output torque with a small volume, thus providing good lifting performance. In addition, because the temperature in the mine does not change much, the temperature condition does not have great impact on the hydraulic motor that uses hydraulic oil. It can be understood that the driving portion 162 may also be an electric motor or other power device.

In this embodiment, the power mechanism 16 specifically may be a double-chain hydraulic lifting hoist. In this way, the lifting mechanism only needs to use one double-chain hydraulic lifting hoist to cooperate with the configuration of the two movable sprockets 14 in the hanging base 121, making the configuration of the lifting mechanism compact. Furthermore, the double-chain hydraulic hoist is a common component in the art, so the production costs of the lifting mechanism can be reduced and the production efficiency can be improved.

In this embodiment, the fixed sprocket 161, the movable sprocket 14 and the distance adjusting sprocket 15 may all be eight-tooth ring sprockets, which have a small number of teeth, provide stronger carrying capacity, achieve stable transmission, and enhance the universality and interchangeability of components.

It can be understood that in other embodiments, the positions of the power mechanism 16 and the distance adjusting sprocket 15 are interchangeable. When the positions of the power mechanism 16 and the distance adjusting sprocket 15 are interchanged, two power mechanisms 16 are provided, each of which is disposed at a respective one of two sides of the hanging base 121, each of the power mechanisms 16 includes one fixed sprocket 161 and one driving portion 162 configured to drive the fixed sprocket 161, and the two distance adjusting sprockets 15 are disposed above the hanging base 121. An end of the hanging chain 13 is fixed to the middle portion of the lifting beam 11, and the other end of the hanging chain 13 engages the movable sprocket 14, the distance adjusting sprocket 15, and the fixed sprocket 161 in sequence. In this embodiment, each of the power mechanisms 16 may be a single-chain hydraulic lifting hoist.

Embodiment 2

Figure 3:
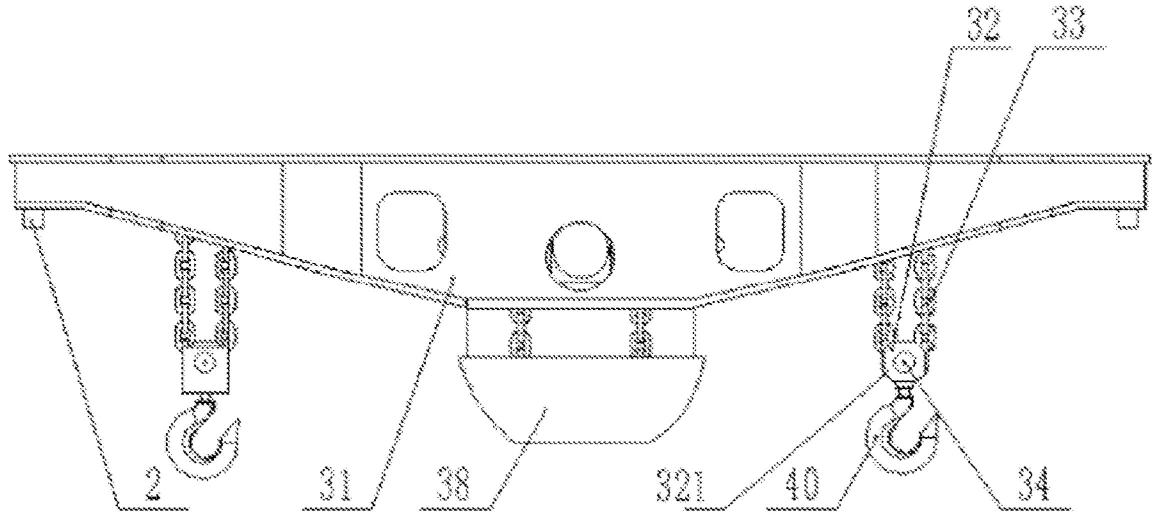
FIG. 3 shows a schematic diagram of a lifting mechanism for lifting a cargo container of an overhead monorail according to Embodiment 2 of the present invention.
Figure 4:
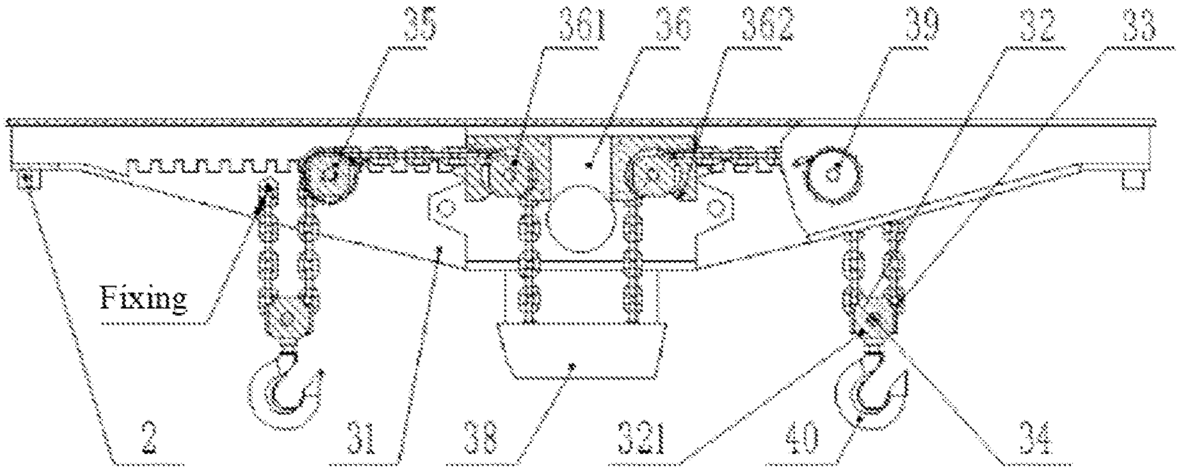
FIG. 4 shows a schematic cross-sectional view of FIG. 3.
Figure 5:
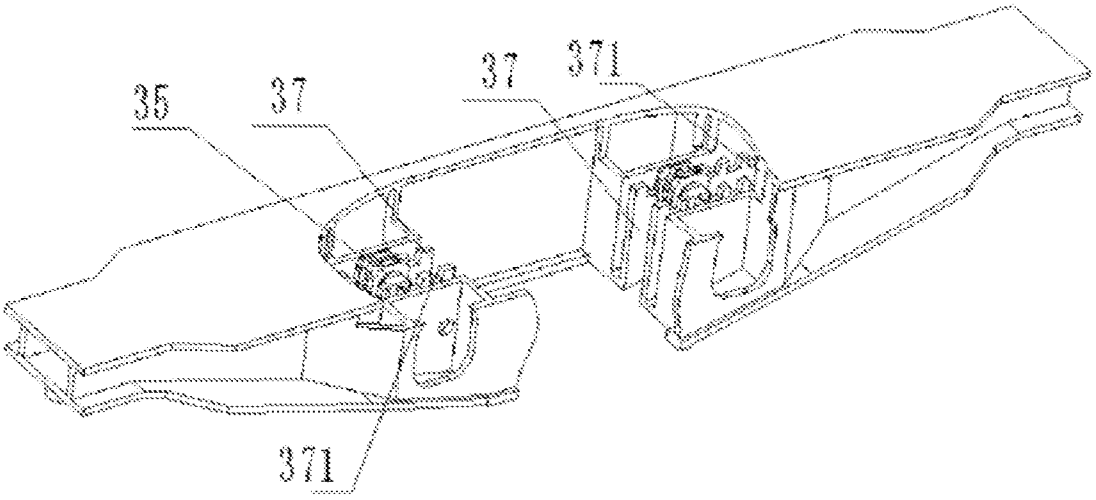
FIG. 5 shows a schematic diagram illustrating internal space of a lifting beam of the lifting mechanism for lifting a cargo container of an overhead monorail according to Embodiment 2 of the present invention.

FIG. 3 is a schematic diagram of a lifting mechanism for lifting a cargo container of an overhead monorail according to Embodiment 2 of the present invention. FIG. 4 is a schematic cross-sectional view of FIG. 3. FIG. 5 is a schematic diagram illustrating internal space of a lifting beam of the lifting mechanism for lifting a cargo container of an overhead monorail according to Embodiment 2 of the present invention. The lifting mechanism in this embodiment is fixed below two suspension apparatuses of the overhead monorail, and to lift a cargo container, only one lifting mechanism needs to be used. As shown in FIGS. 3-5, the lifting mechanism includes a lifting beam 31, a hanging portion 32, a hanging chain 33, a movable sprocket 34, a distance adjusting sprocket 35 and a power mechanism 36. The hanging portion 32 is suspended below the lifting beam 31 by the hanging chain 33. The hanging portion 32 includes a hanging base 321 and a hanging member connected below the hanging base 321. The movable sprocket 34 is disposed on the hanging base 321. The distance adjusting sprocket 35 and the power mechanism 36 are arranged side by side and separately on the lifting beam 31. The power mechanism 36 may include a fixed sprocket 361 and a driving portion 362 configured to drive the fixed sprocket 361 to rotate. The fixed sprocket 361 is driven by the driving portion 362 to drive the hanging chain 33 to move so as to lift or lower the hanging portion 32. An end of the hanging chain 33 is fixed to the lifting beam 31, and the other end of the hanging chain 33 engages the movable sprocket 34, the distance adjusting sprocket 35, and the fixed sprocket 361 in sequence.

Specifically, in this embodiment, two hanging chains 33 are provided, and two hanging portions 32, two movable sprockets 34, two fixed sprockets 361 and two distance adjusting sprockets 35 are provided, and each of the hanging portions 32 includes one hanging base 321. The power mechanism 36 is located in a middle portion of the lifting beam 31. The two fixed sprockets 361 are disposed side by side. The two distance adjusting sprockets 35 are symmetrically distributed on both sides of the power mechanism 36. Each of the two movable sprockets 34 is disposed on the respective hanging base 321. Each of the two hanging portions 32 corresponds to a respective one of the positions of the two distance adjusting sprockets 35 and is suspended below the lifting beam 31. An end of each of the two hanging chains 33 is fixed to a respective one of two ends of the lifting beam 31, and the other end of each of the two hanging chains 33 engages the respective movable sprocket 34, distance adjusting sprocket 35, and fixed sprocket 361 in sequence. Each of the two hanging portions 32 may correspond to a respective one of two ends of an object to be lifted, for example, two ends of a cargo container, so that the object to be lifted can be lifted stably by using only one lifting mechanism.

Further, referring to FIG. 5, the lifting beam 31 in this embodiment includes vertical plates 37. The vertical plate 37 is provided with a plurality of slots 371. The two distance adjusting sprockets 35 each are disposed on the slots 371. The distance between the two hanging portions 32 is adjusted by adjusting the two distance adjusting sprockets 35 to be located on different slots 371 on the vertical plate 37. In this way, the distance between the two hanging portions 32 can be adjusted based on different specifications of objects to be lifted.

In this embodiment, upper ends of the two vertical plates 37 are provided with at least three pairs of the slots in pairs. Two ends of each of the distance adjusting sprockets 35 are disposed on one pair of slots on the two vertical plates 37. The hanging chain 33 engages the distance adjusting sprocket 35 and is located between the two vertical plates 37. The two vertical plates 37 spaced apart from each other provide a simple structure that can adjust the distance between the two hanging portions 32. It can be understood that other structures such as a gear-rack structure or a screw-nut structure may also be used for adjustment.

In this embodiment, the lifting mechanism further includes a hanging chain bag 38. The hanging chain bag 38 is suspended below the middle portion of the lifting beam 31. The other end of each of the two hanging chains 33, after engaging the respective fixed sprocket 361, is accommodated in the hanging chain bag 38. The hanging chain bag 38 is configured to accommodate excess chain after lifting, thereby improving the safety. It can be understood that the hanging chain bag 38 may be other form of apparatus configured to accommodate or receive the hanging chain 33, for example, may be a winch drum configured to wind the excess hanging chain 33.

In this embodiment, one hanging chain bag 38 may be provided to accommodate the two hanging chains 33. In order to prevent the two hanging chains 33 from being entangled with each other, the hanging chain bag 38 may be divided into two accommodating spaces, that is, the other end of each of the two hanging chains 33, after engaging the respective fixed sprocket 361, is accommodated in the respective accommodating space. It can be understood that two hanging chain bags 38 also may be provided. The two hanging chain bags 38 may be disposed side by side below the middle portion of the lifting beam 31. The other end of each of the two hanging chains 33, after engaging the respective fixed sprocket 361, is accommodated in the respective hanging chain bag 38.

In this embodiment, the lifting mechanism further includes a ratchet mechanism 39 disposed on the lifting beam 31. When the driving portion 362 drives the fixed sprocket 361 to rotate, the ratchet mechanism 39 rotates to move the hanging chain 33. When the driving portion 362 stops driving the fixed sprocket 361, the ratchet mechanism 39 is stopped to prevent the hanging chain 33 from rotating reversely. Here, the characteristic that the ratchet mechanism 39 is rotatable only in one direction and not rotatable in the reverse direction is utilized to prevent uncontrolled reverse rotation of the hanging chain 33. After the lifting operation is completed, if a new lifting operation is to be started, the ratchet mechanism 39 may be moved or rotated, so that the hanging chain 33 moves to detach from the ratchet mechanism 39 and lay down the hanging portion 32. In this case, the hanging chain 33 can rotate reversely. It can be understood that the mechanism that prevents the hanging chain 33 from rotating reversely may be a mechanism other than the ratchet mechanism 39, for example, may be a brake mechanism, etc.

In this embodiment, the ratchet mechanism 39 is disposed on the fixed sprocket 361 or the distance adjusting sprocket 35. Specifically, a ratchet in the ratchet mechanism 39 may be coaxial with the fixed sprocket 361 or the distance adjusting sprocket 35. In this way, the structure is relatively simple and does not require any additional component for engaging the ratchet mechanism 39 with the hanging chain 33. It can be understood that the ratchet mechanism 39 may be installed in other ways as long as the hanging chain 33 can be prevented from uncontrolled reverse rotation.

In this embodiment, the hanging member specifically may be a hook 40. It can be understood that the hanging member may also be in other forms, for example, may be one or more of a hook, a hanger rod or a hanging rope, to facilitate the lifting of different objects to be lifted.

In this embodiment, the driving portion 362 specifically may be a hydraulic motor. The hydraulic motor can obtain a high output torque with a small volume, thus providing good lifting performance. In addition, because the temperature in the mine does not change much, the temperature condition does not have great impact on the hydraulic motor that uses hydraulic oil. It can be understood that the driving portion 362 may also be an electric motor or other power device.

In this embodiment, the power mechanism 36 specifically may be a double-chain hydraulic lifting hoist. In this way, the lifting mechanism only needs to use one double-chain hydraulic lifting hoist to cooperate with the configuration of the two movable sprockets 34 in the hanging base 321, making the configuration of the lifting mechanism compact. Furthermore, the double-chain hydraulic hoist is a common component in the art, so the production costs of the lifting mechanism can be reduced and the production efficiency can be improved.

In this embodiment, the fixed sprocket 361, the movable sprocket 34 and the distance adjusting sprocket 35 may all be eight-tooth ring sprockets, which have a small number of teeth, provide stronger carrying capacity, achieve stable transmission, and enhance the universality and interchangeability of components.

It can be understood that in other embodiments, the positions of the power mechanism 36 and the distance adjusting sprocket 35 are interchangeable. When the positions of the power mechanism 36 and the distance adjusting sprocket 35 are interchanged, two power mechanisms 36 are provided, each of which is disposed at a respective one of two sides of the hanging base 321, each of the power mechanisms 36 includes one fixed sprocket 361 and one driving portion 362 configured to drive the fixed sprocket 361, and the two distance adjusting sprockets 35 are disposed above the hanging base 321. An end of the hanging chain 33 is fixed to one side of the lifting beam 11, and the other end of the hanging chain 33 engages the movable sprocket 34, the fixed sprocket 361, and the distance adjusting sprocket 35 in sequence. In this embodiment, each of the power mechanisms 36 may be a single-chain hydraulic lifting hoist.

Embodiment 3

The embodiments of the present invention further provide an overhead monorail. The overhead monorail may include at least two suspension apparatuses and a lifting mechanism according to any one of Embodiment 1 or 2. Here, the suspension apparatus is an apparatus that is disposed on a guide rail of the overhead monorail, can move on the guide rail, and is configured for installing the lifting mechanism.

Figure 6:
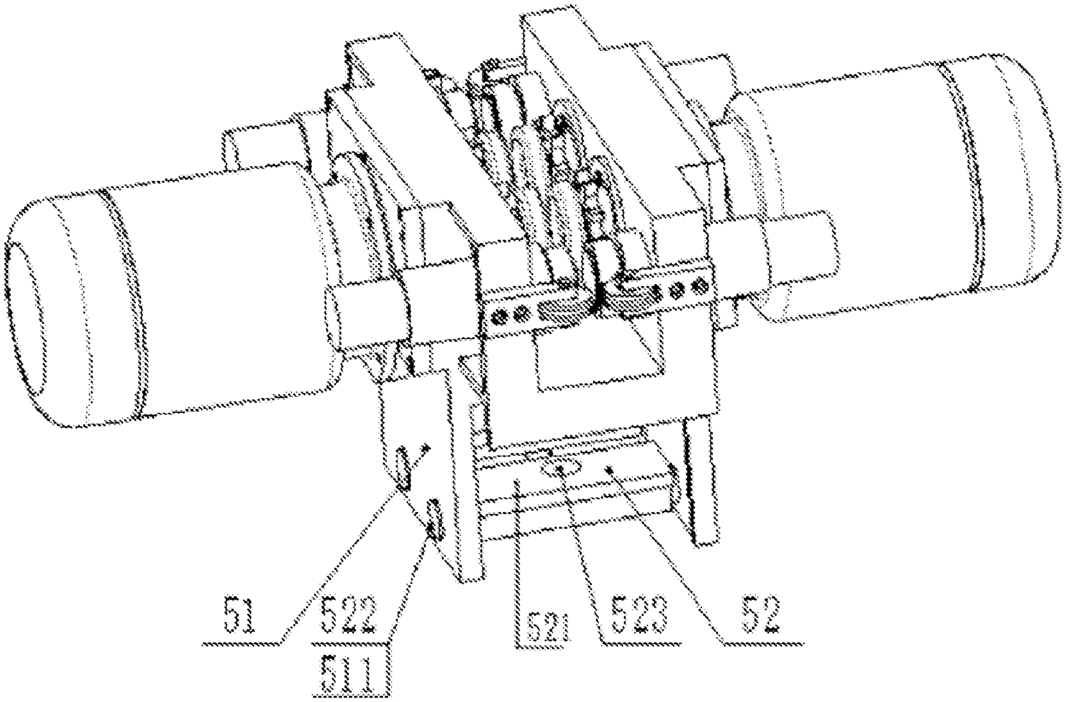
FIG. 6 shows a schematic view of a suspension apparatus in an overhead monorail according to Embodiment 3 of the present invention.
Figure 7:
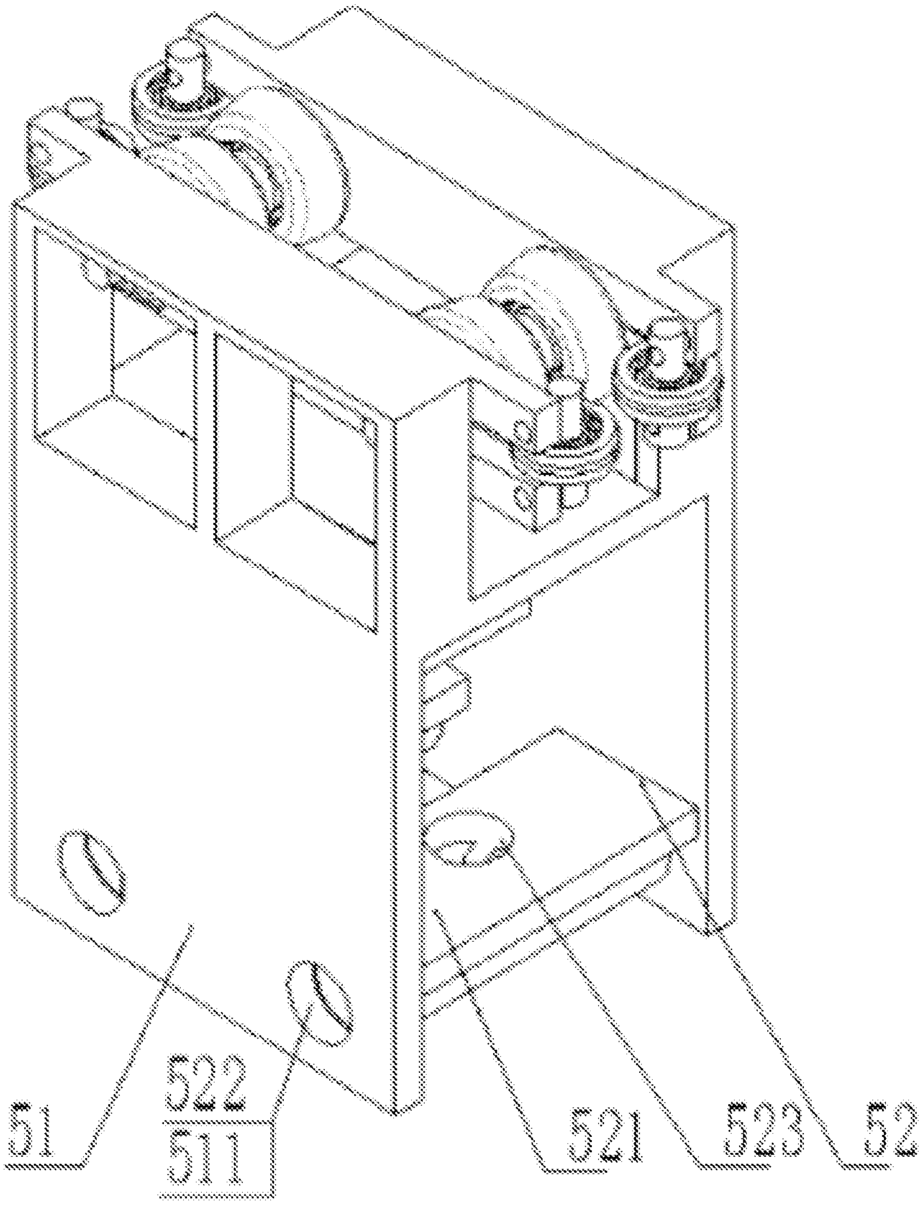
FIG. 7 shows a schematic view of another suspension apparatus in an overhead monorail according to Embodiment 3 of the present invention.

FIG. 6 is a schematic view of a suspension apparatus in an overhead monorail according to Embodiment 3 of the present invention. FIG. 7 is a schematic view of another suspension apparatus in an overhead monorail according to Embodiment 3 of the present invention. As shown in FIGS. 6 and 7, the suspension apparatus includes a cabinet 51 and a mounting portion 52 provided on the cabinet 51. Each of the two ends of the lifting beam is mounted on a respective one of the mounting portions 52 of two suspension apparatuses. It can be understood that a plurality of mounting portions may be disposed, to make the mounting more secure.

The cabinet 51 is provided with at least one pair of rotary shaft holes 511 coaxially disposed. The mounting portion 52 includes a bearing plate 521 and rotary shafts 522 coaxially disposed at both ends of the bearing plate 521. A middle portion of the bearing plate 521 is provided with a pin hole 523 perpendicular to the rotary shafts 522. Each of the two rotary shafts 522 is rotatably disposed in the respective rotary shaft hole 511. In this way, the bearing plate 521 can rotate about an axis of the rotary shafts 522.

Referring to FIGS. 1-4, the lifting beam 11 or 31 includes a beam body and fixing pins 2 disposed at both ends of the beam body. Each of the fixing pins 2 is rotatably inserted into the pin hole 523 on the mounting portion 52 of the respective suspension apparatus. In this way, the lifting beam 11 or 31 has two degrees of freedom of rotation. Specifically, both ends of the lifting beam 11 or 31 can rotate in the horizontal direction with respect to the suspension apparatus, i.e., the relative rotation of the fixing pin 2 in the pin hole 523. The lifting beam 11 or 31 can rotate in the vertical direction with respect to the suspension apparatus, i.e., the relative rotation of the rotary shaft 522 in the rotary shaft hole 511. In this way, the overhead monorail can run stably on horizontal turns or slopes on the track.

The suspension apparatus shown in FIG. 7 is different from the suspension apparatus shown in FIG. 6 in that no power component such as an electric motor is provided, so that when the object to be lifted is not too heavy, the entire overhead monorail may be equipped with some suspension apparatus as shown in FIG. 6 and some suspension apparatus as shown in FIG. 7, thereby reducing the energy consumption of the entire overhead monorail.

Figure 8:
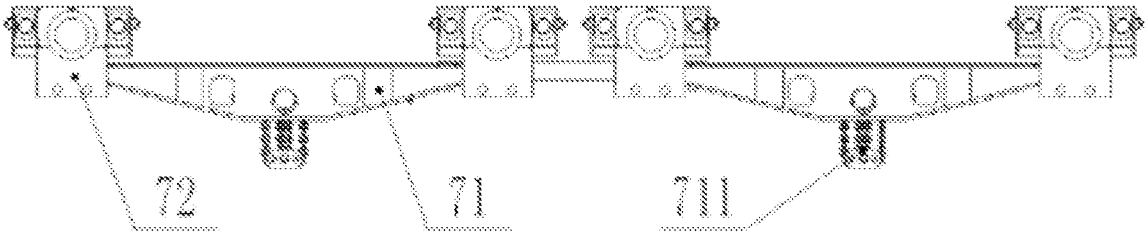
FIG. 8 shows a schematic assembly view of a lifting mechanism and suspension apparatus for lifting a heavy object in the overhead monorail according to Embodiment 3 of the present invention.

FIG. 8 is a schematic assembly view of a lifting mechanism and suspension apparatus for lifting a heavy object in the overhead monorail according to Embodiment 3 of the present invention. As shown in FIG. 8, both ends of each lifting beam 71 are mounted on two suspension apparatuses 72, and each of the two lifting beams 71 includes one hanging base 711 corresponding to an end of the object to be lifted, making the lifting more balanced.

As can be seen from the figure, one lifting beam 71 requires two suspension apparatuses 72, and two lifting beams 71 require four suspension apparatuses 72, which is because the lifting mechanism in this embodiment is used for lifting a heavy object. In other embodiments, the suspension apparatus 72 may be configured according to the actual situation of the object to be lifted. For example, a lifting beam 71 may be mounted at each of the two ends of one suspension apparatus 72. In this way, only three suspension apparatuses 72 are required for two lifting beams 71, only four suspension apparatuses 72 are required for three lifting beams 71, and so on, thereby further reducing the energy consumption.

The present invention has been described in detail with reference to preferred embodiments, which however are not intended to limit the scope of protection of the present invention. Any modifications, equivalent improvements and substitutions can be made without departing from the spirit and principle of the present invention, which are all fall within the scope of protection of the present invention.

INDUSTRIAL APPLICABILITY

According to the lifting mechanism for an overhead monorail and the overhead monorail in the embodiments of the present invention, the hanging portion which is suspended by the hanging chain and can move up and down is directly disposed below the lifting beam to lift heavy objects, i.e., the lifting capacity is increased by using the principle of movable pulley, without needing to use a multi-layer structure. The present invention achieves a high lifting height for the object to be lifted, and features a simple structure. The principle of the embodiments of the present invention is as follows. The hanging portion which is suspended by the hanging chain and can move up and down is directly disposed below the lifting beam to lift heavy objects, i.e., the lifting capacity is increased by using the principle of movable pulley, without needing to use a multi-layer structure. The present invention achieves a high lifting height for the object to be lifted, and features a simple structure.

The present invention will be further described below with reference to the accompanying drawings and specific embodiments. It should be understood that the specific embodiments described herein are merely used for explaining the present invention, and are not intended to limit the present invention.

It should be noted that in the description of the embodiments of the present invention, unless otherwise specified and defined, the term "connect" or any variant thereof should be understood in a broad sense. For example, it may be an electrical connection, or a communication between two components, and may be a direct connection, or an indirect connection via an intermediate medium. For those of ordinary skill in the art, the specific meaning of the above terms can be understood according to specific circumstances.

It should be noted that the terms such as "first/second/third" as used in the embodiments of the present invention are only for distinguishing similar objects and do not represent a specific order for the objects. It should be understood that "first/second/third" can be interchanged in a specific order or sequence when permitted. It should be understood that the objects distinguished by "first\second\third" can be interchanged under appropriate circumstances, so that the embodiments of the present invention described herein can be implemented in an order other than those illustrated or described herein.

Embodiment 1

FIG. 1 is a schematic diagram of a lifting mechanism for heavy objects of an overhead monorail according to Embodiment 1 of the present invention. FIG. 2 is a schematic cross-sectional view of FIG. 1. The lifting mechanism in this embodiment is fixed below two suspension apparatuses, and to lift of a heavy object, generally two or more lifting mechanisms are used. As shown in FIGS. 1 and 2, the lifting mechanism includes a lifting beam 11, a hanging portion 12, a hanging chain 13, a movable sprocket 14, a distance adjusting sprocket 15 and a power mechanism 16. The hanging portion 12 is suspended below the lifting beam 11 by the hanging chain 13. The hanging portion 12 includes a hanging base 121 and a hanging member connected below the hanging base 121. The movable sprocket 14 is disposed on the hanging base 121. The distance adjusting sprocket 15 and the power mechanism 16 are arranged side by side and separately on the lifting beam 11. The power mechanism 16 may include a fixed sprocket 161 and a driving portion 162 configured to drive the fixed sprocket 161 to rotate. The fixed sprocket 161 is driven by the driving portion 162 to drive the hanging chain 13 to move so as to lift or lower the hanging portion 12. An end of the hanging chain 13 is fixed to the lifting beam 11, and the other end of the hanging chain 13 engages the movable sprocket 14, the fixed sprocket 161, and the distance adjusting sprocket 15 in sequence.

Specifically, in this embodiment, two hanging chains 13 are provided, one hanging base 121 is provided, and two movable sprockets 14, two fixed sprockets 161 and two distance adjusting sprockets 15 are provided. The power mechanism 16 is located in the middle portion of the lifting beam 11. The two fixed sprockets 161 are disposed side by side. The hanging portion 12 is located below the middle portion of the lifting beam 11. The two distance adjusting sprockets 15 are symmetrically distributed on both sides of the power mechanism 16. The two movable sprockets 14 are disposed side by side on the one hanging base 121. An end of each of the two hanging chains 13 is fixed to the middle portion of the lifting beam 11, and the other end of each of the two hanging chains 13 engages the respective movable sprocket 14, fixed sprocket 161, and distance adjusting sprocket 15 in sequence. Because the two movable sprockets 14 in this embodiment are disposed side by side on the one hanging base 121, the hanging base 121 can carry a heavy object with a heavier weight, for example, a hydraulic support. However, because the entire lifting mechanism includes only one hanging base 121, generally two or more lifting mechanisms need to be used in combination during lifting, so that the object to be lifted can be lifted from two ends thereof at the same time, making the lifting more steady. It can be understood that three or more movable sprockets 14 may also be disposed on the hanging base 121 so as to carry a heavy object with a greater load.

In this embodiment, the lifting mechanism may further include two hanging chain bags 17. Each of the two hanging chain bags 17 corresponds to a respective one of the positions of the two distance adjusting sprockets 15, and is suspended below the lifting beam 11. The other end of each of the two hanging chains 13, after engaging the respective distance adjusting sprocket 15, is accommodated in the respective hanging chain bag 17. The hanging chain bag 17 is configured to accommodate excess chain after lifting, thereby improving the safety. It can be understood that the hanging chain bag 17 may be other form of apparatus configured to accommodate or receive the hanging chain, for example, may be a winch drum configured to wind the excess hanging chain 13.

In this embodiment, the lifting mechanism may further include a ratchet mechanism 18 disposed on the lifting beam 11. When the driving portion 162 drives the fixed sprocket 161 to rotate, the ratchet mechanism 18 rotates to move the hanging chain 13. When the driving portion 162 stops driving the fixed sprocket 161, the ratchet mechanism 18 is stopped to prevent the hanging chain 13 from rotating reversely. Here, the characteristic that the ratchet mechanism 18 is rotatable only in one direction and not rotatable in the reverse direction is utilized to prevent uncontrolled reverse rotation of the hanging chain 13. After the lifting operation is completed, if a new lifting operation is to be started, the ratchet mechanism 18 may be moved or rotated, so that the hanging chain 13 moves to detach from the ratchet mechanism 18 and lay down the hanging portion 12. In this case, the hanging chain 13 can rotate reversely. It can be understood that the mechanism that prevents the hanging chain 13 from rotating reversely may be a mechanism other than the ratchet mechanism 18, for example, may be a brake mechanism, etc.

In this embodiment, the ratchet mechanism 18 is disposed on the fixed sprocket 161 or the distance adjusting sprocket 15. Specifically, a ratchet in the ratchet mechanism 18 may be coaxial with the fixed sprocket 161 or the distance adjusting sprocket 15. In this way, the structure is relatively simple and does not require any additional component for engaging the ratchet mechanism 18 with the hanging chain 13. It can be understood that the ratchet mechanism 18 may be installed in other ways as long as the hanging chain 13 can be prevented from uncontrolled reverse rotation.

In this embodiment, the hanging member specifically may be a hanger rod 19. It can be understood that the hanging member may also be in other forms, for example, may be one or more of a hook, a hanger rod or a hanging rope, to facilitate the lifting of different objects to be lifted.

In this embodiment, the driving portion 162 specifically may be a hydraulic motor. The hydraulic motor can obtain a high output torque with a small volume, thus providing good lifting performance. In addition, because the temperature in the mine does not change much, the temperature condition does not have great impact on the hydraulic motor that uses hydraulic oil. It can be understood that the driving portion 162 may also be an electric motor or other power device.

In this embodiment, the power mechanism 16 specifically may be a double-chain hydraulic lifting hoist. In this way, the lifting mechanism only needs to use one double-chain hydraulic lifting hoist to cooperate with the configuration of the two movable sprockets 14 in the hanging base 121, making the configuration of the lifting mechanism compact. Furthermore, the double-chain hydraulic hoist is a common component in the art, so the production costs of the lifting mechanism can be reduced and the production efficiency can be improved.

In this embodiment, the fixed sprocket 161, the movable sprocket 14 and the distance adjusting sprocket 15 may all be eight-tooth ring sprockets, which have a small number of teeth, provide stronger carrying capacity, achieve stable transmission, and enhance the universality and interchangeability of components.

It can be understood that in other embodiments, the positions of the power mechanism 16 and the distance adjusting sprocket 15 are interchangeable. When the positions of the power mechanism 16 and the distance adjusting sprocket 15 are interchanged, two power mechanisms 16 are provided, each of which is disposed at a respective one of two sides of the hanging base 121, each of the power mechanisms 16 includes one fixed sprocket 161 and one driving portion 162 configured to drive the fixed sprocket 161, and the two distance adjusting sprockets 15 are disposed above the hanging base 121. An end of the hanging chain 13 is fixed to the middle portion of the lifting beam 11, and the other end of the hanging chain 13 engages the movable sprocket 14, the distance adjusting sprocket 15, and the fixed sprocket 161 in sequence. In this embodiment, each of the power mechanisms 16 may be a single-chain hydraulic lifting hoist.

Embodiment 2

FIG. 3 is a schematic diagram of a lifting mechanism for lifting a cargo container of an overhead monorail according to Embodiment 2 of the present invention. FIG. 4 is a schematic cross-sectional view of FIG. 3. FIG. 5 is a schematic diagram illustrating internal space of a lifting beam of the lifting mechanism for lifting a cargo container of an overhead monorail according to Embodiment 2 of the present invention. The lifting mechanism in this embodiment is fixed below two suspension apparatuses of the overhead monorail, and to lift a cargo container, only one lifting mechanism needs to be used. As shown in FIGS. 3-5, the lifting mechanism includes a lifting beam 31, a hanging portion 32, a hanging chain 33, a movable sprocket 34, a distance adjusting sprocket 35 and a power mechanism 36. The hanging portion 32 is suspended below the lifting beam 31 by the hanging chain 33. The hanging portion 32 includes a hanging base 321 and a hanging member connected below the hanging base 321. The movable sprocket 34 is disposed on the hanging base 321. The distance adjusting sprocket 35 and the power mechanism 36 are arranged side by side and separately on the lifting beam 31. The power mechanism 36 may include a fixed sprocket 361 and a driving portion 362 configured to drive the fixed sprocket 361 to rotate. The fixed sprocket 361 is driven by the driving portion 362 to drive the hanging chain 33 to move so as to lift or lower the hanging portion 32. An end of the hanging chain 33 is fixed to the lifting beam 31, and the other end of the hanging chain 33 engages the movable sprocket 34, the distance adjusting sprocket 35, and the fixed sprocket 361 in sequence.

Specifically, in this embodiment, two hanging chains 33 are provided, and two hanging portions 32, two movable sprockets 34, two fixed sprockets 361 and two distance adjusting sprockets 35 are provided, and each of the hanging portions 32 includes one hanging base 321. The power mechanism 36 is located in the middle portion of the lifting beam 31. The two fixed sprockets 361 are disposed side by side. The two distance adjusting sprockets 35 are symmetrically distributed on both sides of the power mechanism 36. Each of the two movable sprockets 34 is disposed on the respective hanging base 321. Each of the two hanging portions 32 corresponds to a respective one of the positions of the two distance adjusting sprockets 35 and is suspended below the lifting beam 31. An end of each of the two hanging chains 33 is fixed to a respective one of two ends of the lifting beam 31, and the other end of each of the two hanging chains 33 engages the respective movable sprocket 34, distance adjusting sprocket 35, and fixed sprocket 361 in sequence. Each of the two hanging portions 32 may correspond to a respective one of two ends of an object to be lifted, for example, two ends of a cargo container, so that the object to be lifted can be lifted stably by using only one lifting mechanism.

Further, referring to FIG. 5, the lifting beam 31 in this embodiment includes vertical plates 37. The vertical plate 37 is provided with a plurality of slots 371. The two distance adjusting sprockets 35 each are disposed on the slots 371. The distance between the two hanging portions 32 is adjusted by adjusting the two distance adjusting sprockets 35 to be located on different slots 371 on the vertical plate 37. In this way, the distance between the two hanging portions 32 can be adjusted based on different specifications of objects to be lifted.

In this embodiment, upper ends of the two vertical plates 37 are provided with at least three pairs of the slots in pairs. Two ends of each of the distance adjusting sprockets 35 are disposed on one pair of slots on the two vertical plates 37. The hanging chain 33 engages the distance adjusting sprocket 35 and is located between the two vertical plates 37. The two vertical plates 37 spaced apart from each other provide a simple structure that can adjust the distance between the two hanging portions 32. It can be understood that other structures such as a gear-rack structure or a screw-nut structure may also be used for adjustment.

In this embodiment, the lifting mechanism further includes a hanging chain bag 38. The hanging chain bag 38 is suspended below the middle portion of the lifting beam 31. The other end of each of the two hanging chains 33, after engaging the respective fixed sprocket 361, is accommodated in the hanging chain bag 38. The hanging chain bag 38 is configured to accommodate excess chain after lifting, thereby improving the safety. It can be understood that the hanging chain bag 38 may be other form of apparatus configured to accommodate or receive the hanging chain 33, for example, may be a winch drum configured to wind the excess hanging chain 33.

In this embodiment, one hanging chain bag 38 may be provided to accommodate the two hanging chains 33. In order to prevent the two hanging chains 33 from being entangled with each other, the hanging chain bag 38 may be divided into two accommodating spaces, that is, the other end of each of the two hanging chains 33, after engaging the respective fixed sprocket 361, is accommodated in the respective accommodating space. It can be understood that two hanging chain bags 38 also may be provided. The two hanging chain bags 38 may be disposed side by side below the middle portion of the lifting beam 31. The other end of each of the two hanging chains 33, after engaging the respective fixed sprocket 361, is accommodated in the respective hanging chain bag 38.

In this embodiment, the lifting mechanism further includes a ratchet mechanism 39 disposed on the lifting beam 31. When the driving portion 362 drives the fixed sprocket 361 to rotate, the ratchet mechanism 39 rotates to move the hanging chain 33. When the driving portion 362 stops driving the fixed sprocket 361, the ratchet mechanism 39 is stopped to prevent the hanging chain 33 from rotating reversely. Here, the characteristic that the ratchet mechanism 39 is rotatable only in one direction and not rotatable in the reverse direction is utilized to prevent uncontrolled reverse rotation of the hanging chain 33. After the lifting operation is completed, if a new lifting operation is to be started, the ratchet mechanism 39 may be moved or rotated, so that the hanging chain 33 moves to detach from the ratchet mechanism 39 and lay down the hanging portion 32. In this case, the hanging chain 33 can rotate reversely. It can be understood that the mechanism that prevents the hanging chain 33 from rotating reversely may be a mechanism other than the ratchet mechanism 39, for example, may be a brake mechanism, etc.

In this embodiment, the ratchet mechanism 39 is disposed on the fixed sprocket 361 or the distance adjusting sprocket 35. Specifically, a ratchet in the ratchet mechanism 39 may be coaxial with the fixed sprocket 361 or the distance adjusting sprocket 35. In this way, the structure is relatively simple and does not require any additional component for engaging the ratchet mechanism 39 with the hanging chain 33. It can be understood that the ratchet mechanism 39 may be installed in other ways as long as the hanging chain 33 can be prevented from uncontrolled reverse rotation.

In this embodiment, the hanging member specifically may be a hook 40. It can be understood that the hanging member may also be in other forms, for example, may be one or more of a hook, a hanger rod or a hanging rope, to facilitate the lifting of different objects to be lifted.

In this embodiment, the driving portion 362 specifically may be a hydraulic motor. The hydraulic motor can obtain a high output torque with a small volume, thus providing good lifting performance. In addition, because the temperature in the mine does not change much, the temperature condition does not have great impact on the hydraulic motor that uses hydraulic oil. It can be understood that the driving portion 362 may also be an electric motor or other power device.

In this embodiment, the power mechanism 36 specifically may be a double-chain hydraulic lifting hoist. In this way, the lifting mechanism only needs to use one double-chain hydraulic lifting hoist to cooperate with the configuration of the two movable sprockets 34 in the hanging base 321, making the configuration of the lifting mechanism compact. Furthermore, the double-chain hydraulic hoist is a common component in the art, so the production costs of the lifting mechanism can be reduced and the production efficiency can be improved.

In this embodiment, the fixed sprocket 361, the movable sprocket 34 and the distance adjusting sprocket 35 may all be eight-tooth ring sprockets, which have a small number of teeth, provide stronger carrying capacity, achieve stable transmission, and enhance the universality and interchangeability of components.

It can be understood that in other embodiments, the positions of the power mechanism 36 and the distance adjusting sprocket 35 are interchangeable. When the positions of the power mechanism 36 and the distance adjusting sprocket 35 are interchanged, two power mechanisms 36 are provided, each of which is disposed at a respective one of two sides of the hanging base 321, each of the power mechanisms 36 includes one fixed sprocket 361 and one driving portion 362 configured to drive the fixed sprocket 361, and the two distance adjusting sprockets 35 are disposed above the hanging base 321. An end of the hanging chain 33 is fixed to one side of the lifting beam 11, and the other end of the hanging chain 33 engages the movable sprocket 34, the fixed sprocket 361, and the distance adjusting sprocket 35 in sequence. In this embodiment, each of the power mechanisms 36 may be a single-chain hydraulic lifting hoist.

Embodiment 3

The embodiments of the present invention further provide an overhead monorail. The overhead monorail may include at least two suspension apparatuses and a lifting mechanism according to any one of Embodiment 1 or 2. Here, the suspension apparatus is an apparatus that is disposed on a guide rail of the overhead monorail, can move on the guide rail, and is configured for installing the lifting mechanism.

FIG. 6 is a schematic view of a suspension apparatus in an overhead monorail according to Embodiment 3 of the present invention. FIG. 7 is a schematic view of another suspension apparatus in an overhead monorail according to Embodiment 3 of the present invention. As shown in FIGS. 6 and 7, the suspension apparatus includes a cabinet 51 and a mounting portion 52 provided on the cabinet 51. Each of the two ends of the lifting beam is mounted on a respective one of the mounting portions 52 of two suspension apparatuses. It can be understood that a plurality of mounting portions may be disposed, to make the mounting more secure.

The cabinet 51 is provided with at least one pair of rotary shaft holes 511 coaxially disposed. The mounting portion 52 includes a bearing plate 521 and rotary shafts 522 coaxially disposed at both ends of the bearing plate 521. The middle portion of the bearing plate 521 is provided with a pin hole 523 perpendicular to the rotary shafts 522. Each of the two rotary shafts 522 is rotatably disposed in the respective rotary shaft hole 511. In this way, the bearing plate 521 can rotate about an axis of the rotary shafts 522.

Referring to FIGS. 1-4, the lifting beam 11 or 31 includes a beam body and fixing pins 2 disposed at both ends of the beam body. Each of the fixing pins 2 is rotatably inserted into the pin hole 523 on the mounting portion 52 of the respective suspension apparatus. In this way, the lifting beam 11 or 31 has two degrees of freedom of rotation. Specifically, both ends of the lifting beam 11 or 31 can rotate in the horizontal direction with respect to the suspension apparatus, i.e., the relative rotation of the fixing pin 2 in the pin hole 523. The lifting beam 11 or 31 can rotate in the vertical direction with respect to the suspension apparatus, i.e., the relative rotation of the rotary shaft 522 in the rotary shaft hole 511. In this way, the overhead monorail can run stably on horizontal turns or slopes on the track.

The suspension apparatus shown in FIG. 7 is different from the suspension apparatus shown in FIG. 6 in that no power component such as an electric motor is provided, so that when the object to be lifted is not too heavy, the entire overhead monorail may be equipped with some suspension apparatus as shown in FIG. 6 and some suspension apparatus as shown in FIG. 7, thereby reducing the energy consumption of the entire overhead monorail.

FIG. 8 is a schematic assembly view of a lifting mechanism and suspension apparatus for lifting a heavy object in the overhead monorail according to Embodiment 3 of the present invention. As shown in FIG. 8, both ends of each lifting beam 71 are mounted on two suspension apparatuses 72, and each of the two lifting beams 71 includes one hanging base 711 corresponding to an end of the object to be lifted, making the lifting more balanced.

As can be seen from the figure, one lifting beam 71 requires two suspension apparatuses 72, and two lifting beams 71 require four suspension apparatuses 72, which is because the lifting mechanism in this embodiment is used for lifting a heavy object. In other embodiments, the suspension apparatus 72 may be configured according to the actual situation of the object to be lifted. For example, a lifting beam 71 may be mounted at each of the two ends of one suspension apparatus 72. In this way, only three suspension apparatuses 72 are required for two lifting beams 71, only four suspension apparatuses 72 are required for three lifting beams 71, and so on, thereby further reducing the energy consumption.

The present invention has been described in detail with reference to preferred embodiments, which however are not intended to limit the scope of protection of the present invention. Any modifications, equivalent improvements and substitutions can be made without departing from the spirit and principle of the present invention, which are all fall within the scope of protection of the present invention.

INDUSTRIAL APPLICABILITY

According to the lifting mechanism for an overhead monorail and the overhead monorail in the embodiments of the present invention, the hanging portion which is suspended by the hanging chain and can move up and down is directly disposed below the lifting beam to lift heavy objects, i.e., the lifting capacity is increased by using the principle of movable pulley, without needing to use a multi-layer structure. The present invention achieves a high lifting height for the object to be lifted, and features a simple structure.

What is claimed is:

1. A lifting mechanism for an overhead monorail, the lifting mechanism comprising a lifting beam, a hanging portion, a hanging chain, a movable sprocket, a distance adjusting sprocket and a power mechanism, wherein the hanging portion is suspended below the lifting beam by the hanging chain, the hanging portion comprises a hanging base and a hanging member connected below the hanging base, and the movable sprocket is disposed on the hanging base;

the distance adjusting sprocket and the power mechanism are arranged side by side and separately on the lifting beam, the power mechanism comprises a fixed sprocket and a driving portion configured to drive the fixed sprocket to rotate, and the fixed sprocket is driven by the driving portion to drive the hanging chain to move so as to lift or lower the hanging portion;

an end of the hanging chain is fixed to the lifting beam, and the other end of the hanging chain engages the movable sprocket, the fixed sprocket, and the distance adjusting sprocket in sequence, or the other end of the hanging chain engages the movable sprocket, the distance adjusting sprocket, and the fixed sprocket in sequence, wherein two said hanging chains are provided, and two said hanging portions, two said movable sprockets, two said fixed sprockets and two said distance adjusting sprockets are provided, and each of the hanging portions comprises one hanging base;

the power mechanism is located in a middle portion of the lifting beam, the two fixed sprockets are disposed side by side, the two distance adjusting sprockets are symmetrically distributed on both sides of the power mechanism, each of the two movable sprockets is disposed on the respective hanging base, and each of the two hanging portions corresponds to a respective one of positions of the two distance adjusting sprockets and is suspended below the lifting beam; and an end of each of the two hanging chains is fixed to a respective one of two ends of the lifting beam, and the other end of each of the two hanging chains engages a respective one of the movable sprockets, a respective one of the distance adjusting sprockets, and a respective one of the fixed sprockets in sequence.

2. The lifting mechanism according to claim 1, wherein the lifting beam comprises an adjusting portion provided with a plurality of slots, the two distance adjusting sprockets each are disposed on the slots of the adjusting portion, and a distance between the two hanging portions is adjusted by adjusting the two distance adjusting sprockets to be located on the different slots on the adjusting portion.

3. The lifting mechanism according to claim 2, wherein the adjusting portion comprises two vertical plates spaced apart from each other, and upper ends of the two vertical plates are provided with at least three pairs of the slots in pairs; and two ends of each of the distance adjusting sprockets are disposed on one pair of the slots on the two vertical plates, and each of the hanging chains engages the respective one of the distance adjusting sprockets and is located between the two vertical plates.

4. The lifting mechanism according to claim 1, wherein the lifting mechanism further comprises a hanging chain bag, and the hanging chain bag is suspended below the middle portion of the lifting beam; and the other end of each of the two hanging chains, after engaging the respective one of the fixed sprockets, is accommodated in the hanging chain bag.

5. The lifting mechanism according to claim 4, wherein two said hanging chain bags are provided, the two hanging chain bags are disposed side by side, and the other end of each of the two hanging chains, after engaging the respective one of the fixed sprockets, is accommodated in a respective one of the hanging chain bags; or one said hanging chain bag is provided, the one hanging chain bag is divided into two accommodating spaces, and the other end of each of the two hanging chains, after engaging the respective one of the fixed sprockets, is accommodated in a respective one of the accommodating spaces.

6. The lifting mechanism according to claim 1, wherein the lifting mechanism further comprises a ratchet mechanism disposed on the lifting beam; and when the driving portion drives the fixed sprocket to rotate, the ratchet mechanism rotates to move the hanging chain; and when the driving portion stops driving the fixed sprocket, the ratchet mechanism is stopped to prevent the hanging chain from rotating reversely.

7. The lifting mechanism according to claim 6, wherein the ratchet mechanism is disposed on the fixed sprocket or the distance adjusting sprocket.

8. The lifting mechanism according to claim 1, wherein the hanging member is one or more of a hook, a hanger rod or a hanging rope.

9. The lifting mechanism according to claim 1, wherein the driving portion is a hydraulic motor or an electric motor.

10. The lifting mechanism according to claim 1, wherein the power mechanism is a double-chain hydraulic lifting hoist.

11. An overhead monorail, comprising at least two suspension apparatuses and the lifting mechanism according to claim 1, wherein each of the suspension apparatuses comprises a cabinet and at least one mounting portion provided on the cabinet, and each of two ends of the lifting beam is mounted on a respective one of the mounting portions of the two suspension apparatuses.

12. The overhead monorail according to claim 11, wherein the cabinet is provided with at least one pair of rotary shaft holes coaxially disposed, the mounting portion comprises a bearing plate and rotary shafts coaxially disposed at both ends of the bearing plate, a middle portion of the bearing plate is provided with a pin hole perpendicular to the rotary shafts, and each of the two rotary shafts is rotatably disposed in a respective one of the rotary shaft holes; and the lifting beam comprises a beam body and fixing pins disposed at both ends of the beam body, and each of the fixing pins is rotatably inserted into the respective pin hole.

* * * * *